US012811481B2

(12) United States Patent
Hobbs

(10) Patent No.: US 12,811,481 B2
(45) Date of Patent: Nov. 24, 2026

(54) CAMERA CONTROL AND STABILIZATION SYSTEM

(71) Applicant: Nodal Film Systems LLC, Los Angeles, CA (US)

(72) Inventor: Boyd Randolph Hobbs, Los Angeles, CA (US)

(73) Assignee: Nodal Film Systems LLC, Los Angeles, CA (US)

( * ) Notice: Subject to any disclaimer, the term of this patent is extended or adjusted under 35 U.S.C. 154(b) by 477 days.

(21) Appl. No.: 18/338,158

(22) Filed: Jun. 20, 2023

(65) Prior Publication Data

US 2024/0030798 A1 Jan. 25, 2024

Related U.S. Application Data

(63) Continuation-in-part of application No. 17/869,601, filed on Jul. 20, 2022, now Pat. No. 12,259,643.

(51) Int. Cl.
*H02K 41/06* (2006.01)
*H02K 3/26* (2006.01)
*H04N 23/68* (2023.01)

(52) U.S. Cl.
CPC ............. *H02K 41/065* (2013.01); *H02K 3/26* (2013.01); *H02K 2203/03* (2013.01); *H04N 23/687* (2023.01)

(58) Field of Classification Search
CPC ............ H02K 5/04; H02K 5/173; H02K 7/00; H02K 7/08; H02K 7/088; H02K 3/26;
(Continued)

(56) References Cited

U.S. PATENT DOCUMENTS 5,969,909 A * 10/1999 Cheong .................. G11B 15/61
6,897,595 B1 * 5/2005 Chiarenza ............ H02K 21/145 310/156.56

(Continued)

FOREIGN PATENT DOCUMENTS

CN 114788252 A 7/2022
DE 102015115676 A1 3/2017

(Continued)

OTHER PUBLICATIONS

Hed, New Concepts for PTR Functionality in Fixed Domes, Master Thesis, Division of Product Development, Department of Design Sciences Faculty of Engineering LTH, Lund University, 2016. (Year: 2016).

(Continued)

*Primary Examiner* — Michael Andrews
(74) *Attorney, Agent, or Firm* — Sean Lynch; Lynch LLP

(57) ABSTRACT

Embodiments of the inventive subject matter are directed to PCB stator motors having radially positioned wheel-based bearings for the rotor, including PCB stator motors that are included in camera stabilizing and control systems. PCB stator motors of the inventive subject matter feature a rotor that creates a slot into which a PCB stator is disposed. Surrounding that rotor is a set of wheels having, e.g., grooves into which an outer edge of the rotor can be disposed. The set of wheels enables the rotor to rotate smoothly as a result of a motor controller activating the PCB stator. In some embodiments, an annular roll motor is accompanied by one or more tilt motors to create a camera system that can, e.g., actively stabilize a camera that is disposed at least partially within the roll motor's interior space.

13 Claims, 6 Drawing Sheets

(58) Field of Classification Search
CPC .. H02K 21/24; H02K 41/065; H02K 2203/03; F16M 11/18; F16M 11/105; F16M 11/20; F16M 11/202; F16M 11/2021; G03B 15/16; G03B 17/561; H04N 23/687
USPC ................................................ 310/90; 396/2
See application file for complete search history.

(56) References Cited

U.S. PATENT DOCUMENTS

| | | | | |
|---|---|---|---|---|
| 9,673,684 | B2 | 6/2017 | Shaw | |
| 9,673,688 | B2 | 6/2017 | Shaw | |
| 9,800,109 | B2 | 10/2017 | Shaw | |
| 9,859,763 | B2 | 1/2018 | Shaw | |
| 10,170,953 | B2 | 1/2019 | Shaw | |
| 10,211,694 | B1 | 2/2019 | Shaw | |
| 10,256,690 | B2 | 4/2019 | Shaw | |
| 11,005,322 | B2 | 5/2021 | Milheim et al. | |
| 11,121,614 | B2 | 9/2021 | Milheim | |
| 11,336,130 | B1 | 5/2022 | Shaw et al. | |
| 11,527,933 | B2 | 12/2022 | Shaw et al. | |
| 11,855,484 | B2 | 12/2023 | Milheim et al. | |
| 12,259,643 | B2 | 3/2025 | Hobbs | |
| 2004/0169434 | A1 | 9/2004 | Washington et al. | |
| 2004/0184798 | A1 | 9/2004 | Dumm | |
| 2006/0055265 | A1* | 3/2006 | Zalusky ................ | H02K 21/24 310/40 MM |
| 2007/0053681 | A1 | 3/2007 | Arbuckle | |
| 2010/0128122 | A1 | 5/2010 | Wright | |
| 2012/0217831 | A1* | 8/2012 | Jore ...................... | H02K 16/04 310/90 |
| 2014/0216023 | A1 | 8/2014 | Rabhi | |
| 2014/0218603 | A1 | 8/2014 | Stone | |
| 2015/0084446 | A1 | 3/2015 | Atar | |
| 2017/0241589 | A1 | 8/2017 | Wang et al. | |
| 2017/0317558 | A1 | 11/2017 | Steg et al. | |
| 2017/0363932 | A1 | 12/2017 | Lim et al. | |
| 2018/0123412 | A1 | 5/2018 | Karplus et al. | |
| 2018/0266621 | A1 | 9/2018 | Zhang et al. | |
| 2018/0283601 | A1 | 10/2018 | Wei | |
| 2019/0063668 | A1 | 2/2019 | Wei | |
| 2019/0074747 | A1 | 3/2019 | Shukla | |
| 2019/0161208 | A1 | 5/2019 | Sun et al. | |
| 2020/0014316 | A1 | 1/2020 | Hobbs | |
| 2020/0116195 | A1 | 4/2020 | Chen et al. | |
| 2020/0145577 | A1 | 5/2020 | Enke et al. | |
| 2021/0083537 | A1* | 3/2021 | Milheim .............. | H02K 1/2733 |
| 2021/0135549 | A1 | 5/2021 | Lee et al. | |
| 2021/0218304 | A1 | 7/2021 | Schuler et al. | |
| 2021/0265889 | A1* | 8/2021 | Frampton ............ | H02K 1/2795 |
| 2021/0387580 | A1 | 12/2021 | Canones Bonham | |
| 2022/0357639 | A1 | 11/2022 | Rubens | |
| 2023/0042319 | A1 | 2/2023 | Brahmavar | |
| 2023/0216363 | A1 | 7/2023 | Hobbs | |
| 2023/0353000 | A1 | 11/2023 | Anvari et al. | |

FOREIGN PATENT DOCUMENTS

| | | | | | |
|---|---|---|---|---|---|
| EP | 3035076 | B1 | | 8/2020 | |
| JP | 06022519 | A | * | 1/1994 | |
| JP | 2015154541 | A | | 8/2015 | |
| WO | WO-2012040071 | A2 | * | 3/2012 | ............... F03D 9/25 |
| WO | 2015039047 | A1 | | 3/2015 | |
| WO | 2018064831 | A1 | | 4/2018 | |
| WO | 2018157591 | A1 | | 9/2018 | |
| WO | 2022141451 | A1 | | 7/2022 | |

OTHER PUBLICATIONS https://pcbmotor.com/wp-content/uploads/2018/05/PCBMotor-Optical-world-_-1.8.pdf.

Guedes-Pinto, Paulo, https://spectrum.ieee.org/axial-flux; This Axial-Flux Motor With a PCB Stator is Ripe for an Electrified World—IEEE Spectrum; Mar. 26, 2022; downloaded Oct. 2, 2024.

https://goinfinitum.com/endurance-and-lifetime-pcb-stators/; Revolutionize Your Motors; downloaded Oct. 2, 2024.

https://pcbstator.com/news/what-pcb-stator-motor/#:~: text=PCB%20Stators%20replace%20the%20bulky; What is a PCB Stator Motor?; downloaded Oct. 2, 2024.

https://www.ewmfg.com/pcb-stator-technology/; PCB Stator Technology | East West Manufacturing; downloaded Oct. 2, 2024.

* cited by examiner

FIG. 7
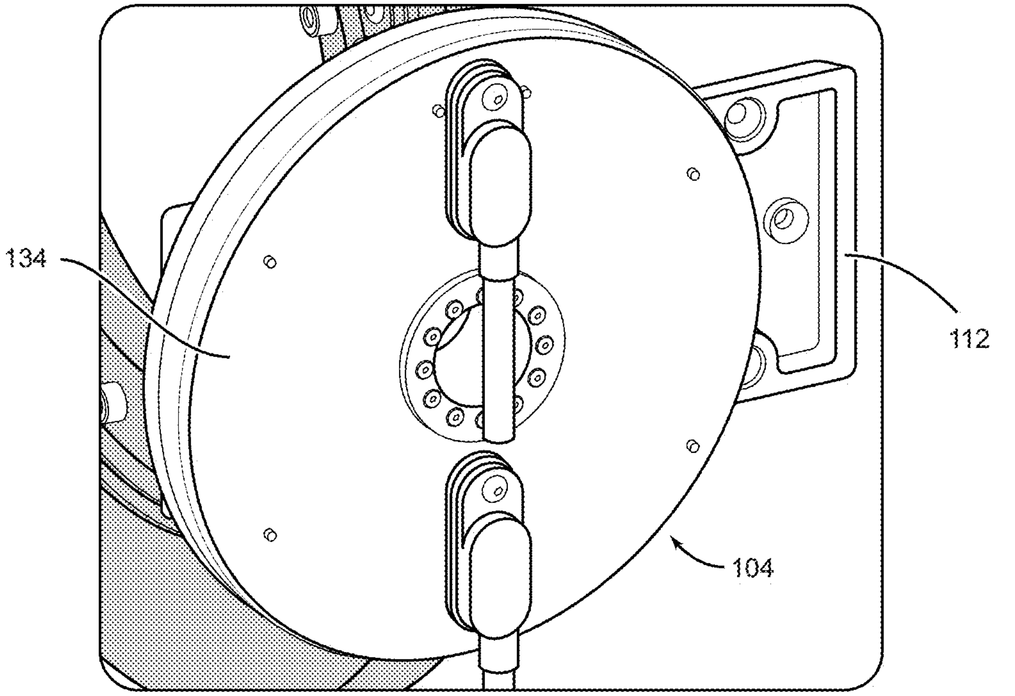
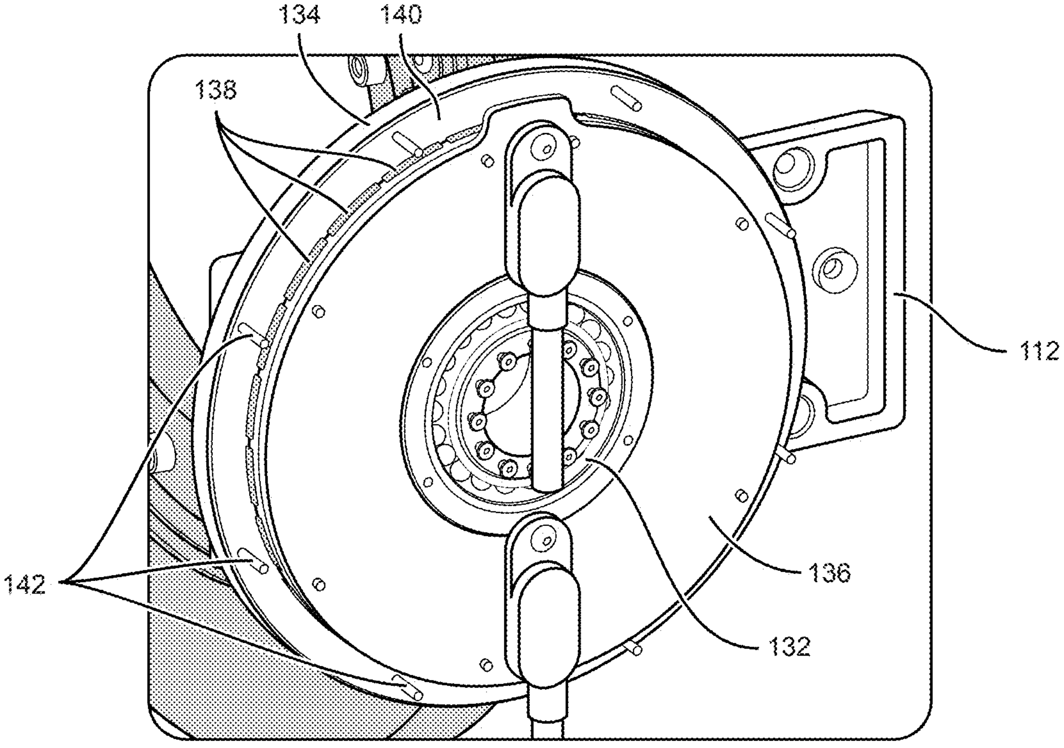
FIG. 8

CAMERA CONTROL AND STABILIZATION SYSTEM

This application claims priority to and is a continuation in part of U.S. patent application Ser. No. 17/869,601, filed Jul. 20, 2022. All extrinsic materials identified in this application are incorporated by reference in their entirety.

FIELD OF THE INVENTION

The field of the invention is camera stabilization and control systems.

BACKGROUND

The background description includes information that may be useful in understanding the present invention. It is not an admission that any of the information provided in this application is prior art or relevant to the presently claimed invention, or that any publication specifically or implicitly referenced is prior art.

In the field of camera control and stabilization, it can be advantageous to configure a system such that the axes of rotation roughly coincide with the camera's image sensor. Existing camera systems that attempt to solve this problem include overly complex mechanical systems that use, e.g., belt or chain drives to transfer mechanical energy to ring-shaped rotating mechanisms. That added complexity creates more opportunities for part failures, while also increasing the overall weight of the system.

Many systems like these are operated by individual camera operators who wear the system as a part of a larger camera rig. Thus, overall weight of the system has an impact on operator fatigue. Reductions in system weight can therefore result in longer shoots with less fatigue, and it can make it possible for camera operators with less physical strength to operate such systems.

By configuring camera systems such that the axes of rotation roughly coincide with the image sensor of the camera, images can be stabilized more easily, and movements of the camera can be more precise. Existing systems fail to contemplate solutions that implement printed circuit board (PCB) motors that make it possible to mount a camera within the motor itself. This reduces weight, reduces complexity, and brings about the desired effects without any of the traditional tradeoffs.

Thus, there is still a need in the art for improved camera operation and stabilization systems.

SUMMARY OF THE INVENTION

The present invention provides apparatuses, systems, and methods directed to printed circuit board (PCB) stator motors and camera systems that implement them. In one aspect of the inventive subject matter, a camera system comprises: a roll motor comprising a roll motor casing, a first printed circuit board (PCB) stator coupled with the roll motor casing, and a roll rotor, where the roll rotor is enabled to rotate by a set of bearings located circumferentially around the roll rotor; at least one tilt motor comprising a tilt motor casing, a second PCB stator coupled with the tilt motor casing, and a tilt rotor; and where the tilt rotor couples with the roll motor casing.

In some embodiments, the tilt rotor couples with the roll motor casing by a tilt motor frame. The at least one tilt motor can be coupled to the tilt motor frame at a position such that an axis of tilt rotation run approximately through an image sensor of a camera mounted within the roll motor. The roll motor can also be configured as an annulus such that a camera can be mounted within an open center portion of the annulus. In some embodiments, the roll rotor has mounting components configured to facilitate mounting a camera within a center portion of the roll motor.

Each bearing of the set of bearings can be a track wheel that is sized and dimensioned to receive an exterior edge of the roll rotor. In some embodiments, each bearing of the set of bearings is attached to the roll motor's casing.

In another aspect of the inventive subject matter, a printed circuit board (PCB) stator motor includes: a motor casing, a PCB stator coupled with the motor casing, and a rotor, where the rotor is enabled to rotate by a set of bearings located circumferentially around the rotor; where the rotor comprises an open center portion; where each bearing of the set of bearings comprises a track wheel having a groove that is sized and dimensioned to receive an outer edge of the rotor; and where each bearing of the set of bearings is attached to an interior portion of the roll motor casing.

In some embodiments, the rotor comprises a slot into which the PCB stator extends. The PCB stator can be configured as a first annulus and where the rotor is configured as a second annulus such that a camera can be mounted within an open center portion of the rotor. In some embodiments, the rotor has mounting components configured to facilitate mounting a camera within the open center portion.

Each bearing of the set of bearings can be configured as a track wheel that is sized and dimensioned to receive an exterior edge of the rotor, and each bearing of the set of bearings can also be attached to the roll motor casing.

In another aspect of the inventive subject matter, a printed circuit board (PCB) stator motor comprises: a PCB stator and a rotor, where the PCB stator is configured to cause the rotor to rotate, and the rotor is enabled to rotate by a set of bearings located circumferentially around the rotor; and where each bearing of the set of bearings is configured to interact an outer edge of the rotor.

In some embodiments, the PCB stator motor further includes an annular motor casing having an interior portion where at least a portion of the rotor is disposed within the interior portion. Each bearing of the set of bearings is attached to an interior portion of the annular motor casing. In some embodiments, the rotor is annular and comprises a slot facing radially outward into which the PCB stator extends. The rotor can have a front side and a back side, the front side comprising a first set of magnets and the back side comprising a second set of magnets, and the first set of magnets and the second set of magnets can then be positioned opposite each other across a slot formed by the front side and the back side of the rotor. Finally, each bearing of the set of bearings can further include a groove that is configured to interact with the outer edge of the rotor.

One should appreciate that the disclosed subject matter provides many advantageous technical effects including minimized form factor, direct drive motor in a compact package, high torque output, and the creation of a large space in the center of a motor that can accommodate, e.g., a camera.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 7 is an exterior view of the tilt motor.

FIG. 8 is the same view with a portion of the tilt motor casing removed.

DETAILED DESCRIPTION

Figure 1:
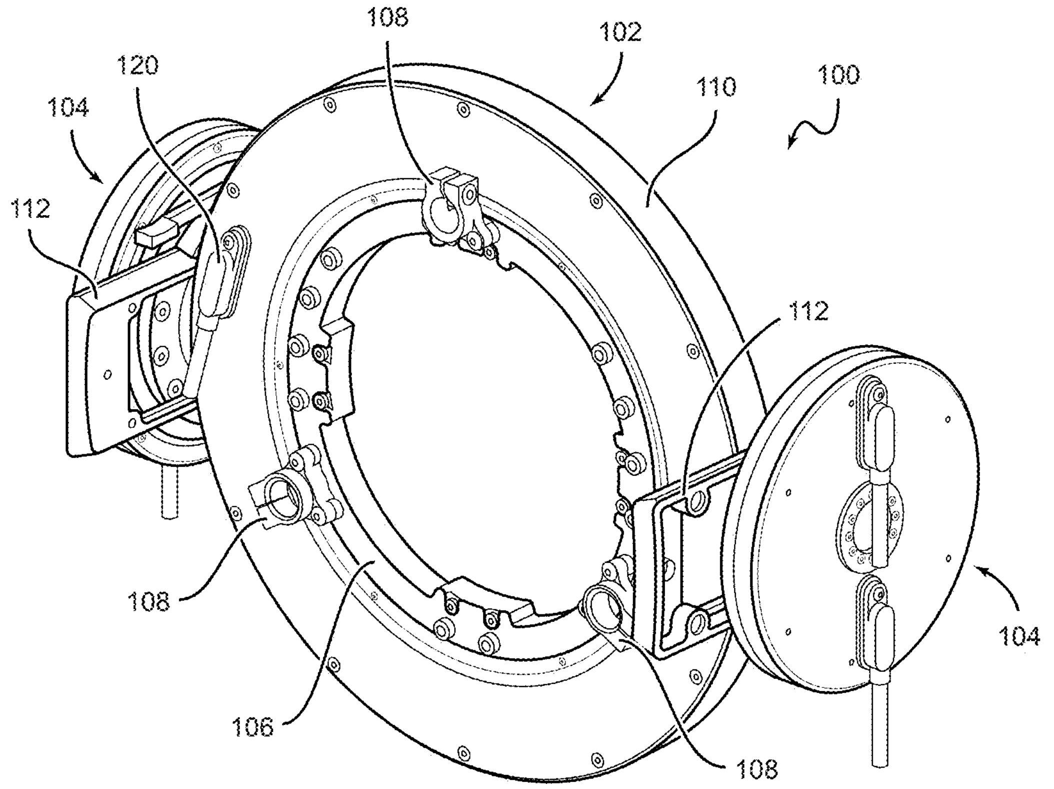
FIG. 1 is a front, perspective view of a camera system of the inventive subject matter.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

The inventive subject matter is directed to camera control and stabilization systems that use printed circuit board (PCB) stator motors. These systems are configured to operate with cameras that are mounted in middle of a roll motor, where the roll motor is further coupled with two tilt motors and can optionally be coupled with a pan motor.

Although this application is primarily focused on the use of PCB stator motors in a camera system, PCB motors of the inventive subject matter can be used in a wide array of different applications that require electric motors that either provide haptic feedback, benefit from the flat configuration, or take advantage of any of the other qualities described in this application or otherwise inherent to the motors.

FIG. 1 shows camera system 100 having a roll motor 102 and two tilt motors 104. Roll motor 102 and tilt motors 104 are all PCB stator motors, which are implemented for their ability to generate high torque and for their unique configurations. Specifically, roll motor 102 is configured in a ring shape with an open center. Roll motor's rotor 106 is shown with a set of camera mounting components 108. Mounting components 108 are configured to, e.g., receive rods that the mounting components 108 can be tightened around, and those rods can then couple with a camera. Mounting components 108 can be configured in a variety of ways that facilitate coupling a camera to rotor 106, and mounting components 108 are fixedly coupled with rotor 106.

Thus, a camera mounted to rotor 106 can be caused to roll by roll motor 102. In embodiments where camera system 100 is handheld, the roll motor 102 can ensure a camera remains level along its roll axis or to control roll while accounting for roll resulting from the camera operator's movements, and in embodiments where camera system 100 is mounted to a stationary structure, roll motor 102 can be used to control roll.

FIG. 1 also shows roll motor casing 110. Roll motor casing 110 surrounds rotor 106, and roll motor casing 110 provides a structure to which a PCB stator can be fixedly coupled. On opposite sides of roll motor 102 are tilt motors 104. Each tilt motor is mounted a tilt motor mount 112 that couples with roll motor casing 110. Tilt motor mount 112 provides a structure to which tilt motors 104 can attach, and each tilt motor mount 112 is configured such that each tilt motor 104 can slide along tilt motor mount 112 before being tightened in place. Sliding tilt motors 104 along tilt motor mounts 112 allows the axis rotation of tilt motors 104 to be moved to a desired location (e.g., roughly to intersect with the position of an image sensor in a mounted camera).

Figure 2:
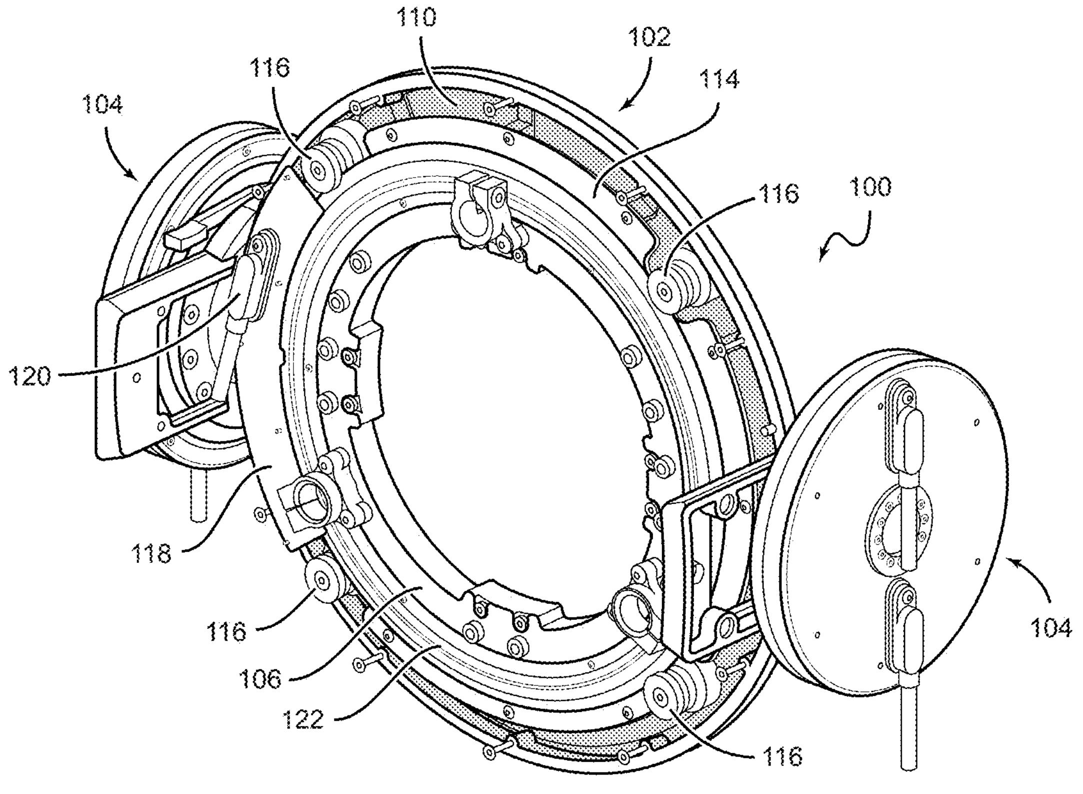
FIG. 2 is the same view with a portion of the roll motor's casing removed.

In FIG. 2, a front portion of roll motor casing 110 is removed to show some internal components. This reveals PCB stator 114, which is shown coupled with the back portion of roll motor casing 110. When the front portion of roll motor casing 110 is attached, PCB stator 114 can couple with both the back portion and the front portion. With the front portion removed, bearings 116 are also visible. Four bearings 116 are shown, though as few as three bearings can be implemented in some embodiments, while in other embodiments, more than four bearings 116 can be implemented.

As opposed to typical DC motor configurations, roll motors of inventive subject have exterior rotor bearings to make it possible to include a large open space in the middle of the motor, thus forming the motor into an annular configuration. This configuration is only possible with PCB stator motors, because only PCB stator motors can have a rotor that is externally mounted and driven by a large, flat PCB stator. The end result is a motor with a thin form fact that creates a large space for a camera to mouth in its center portion.

To drive or control roll motor 102, motor driver circuit board 118 is also contained within roll motor casing 110. Roll motor cable 120 connects to motor driver circuit board 118 and provides power for roll motor 102 as well as any I/O necessary to control roll motor 102. Motor driver circuit board 118 can include any electronic components necessary to control or drive roll motor 102, including one or more microprocessors and so on.

Figure 3:
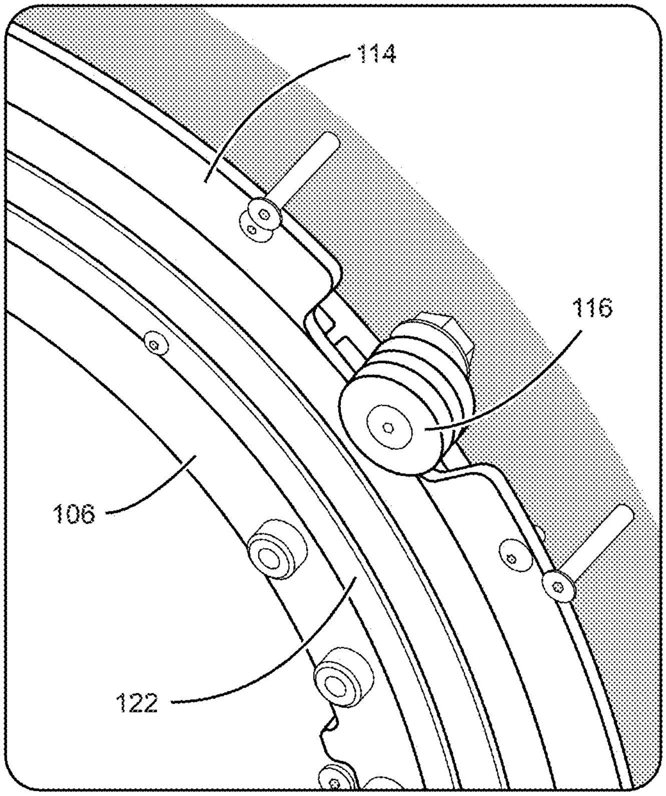
FIG. 3 is a detail view of a bearing for the roll motor.

FIG. 3 shows a closer, front view of camera system 100 showing one of bearings 116 with both the front and back portions of roll motor casing 110 removed. This view shows more clearly that bearing 116 is formed as a track wheel having, e.g., a groove, trough, or similar feature that allows bearing 116 to interact with an outer edge of rotor 106. Bearing 116 thus interacts with rotor 106 with minimal friction between the two components. Bearing 116 and rotor 106 can both be made from hard materials like metal, with minimal component-to-component contact to friction forces between them. Although only one of bearings 116 is shown in this view, all bearings 116 are configured similarly. Bearings 116 all mount to an interior portion of roll motor casing 110 such that rotor 106 can extend into that interior portion to interact with bearings 116.

Figure 4:
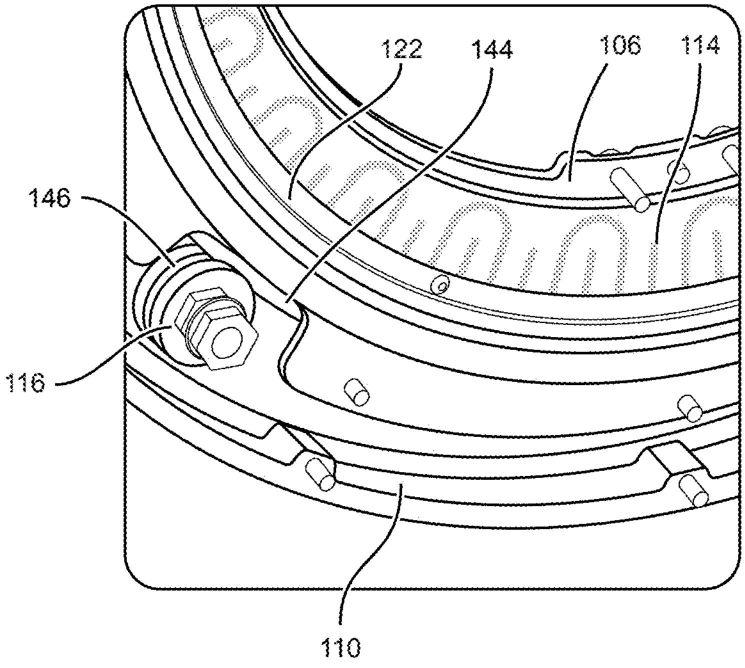
FIG. 4 is a detail view of a different bearing of the roll motor that also shows the printed circuit board (PCB) stator.

FIG. 4 shows a back, closer view of camera system 100. The back portion of roll motor casing 110 is removed and a back portion of rotor 106 is also hidden. This view thus shows PCB stator 114 along with another bearing 116. Dust protector 122 is also visible. Front portion of rotor 106 includes screws 124 and at least one alignment peg 126. Alignment peg 126 is used to align the two portions of rotor 106 before they are coupled together via screws 124. This view also shows that PCB stator 114 includes cutout portions to accommodate bearings 116. Rotor outer edge 144 is shown mated with groove 146 that is disposed on an outer surface of bearing 116.

Figure 5:
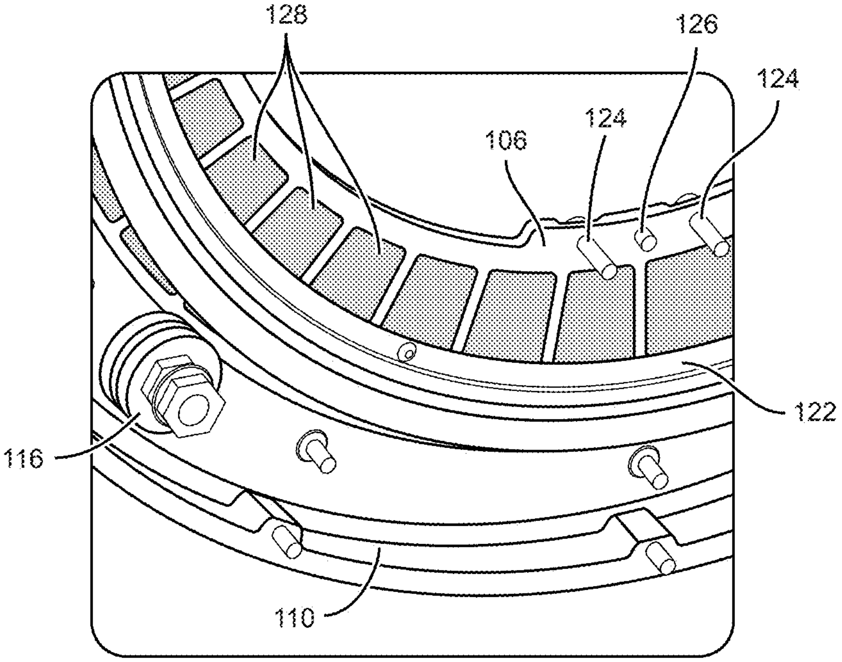
FIG. 5 is the same view with the PCB stator hidden to show a set of magnets on the rotor.

FIG. 5 is similar to FIG. 4 except that PCB stator 114 is also removed. This reveals front portion of rotor 106, which has magnets 128 affixed thereto. Magnets 128 are positioned to interact with induced magnetism in PCB stator 114 during operation of roll motor 102.

All these components together result in a rotor 106 having two portions (a front and a back portion) that are joined together. Both portions of rotor 106 joined together form a circumferential slot that PCB stator 114 fits within. Rotor 106 can thus rotate relative to roll motor casing 110. The configuration of roll motor 106 described above differs from other traditional motor configurations, and even other PCB stator motor configurations, because rotor 106 is enabled to rotated by bearings 116 that surround rotor 106, instead of by one or more bearings that are surrounded by the rotor.

Figure 6:
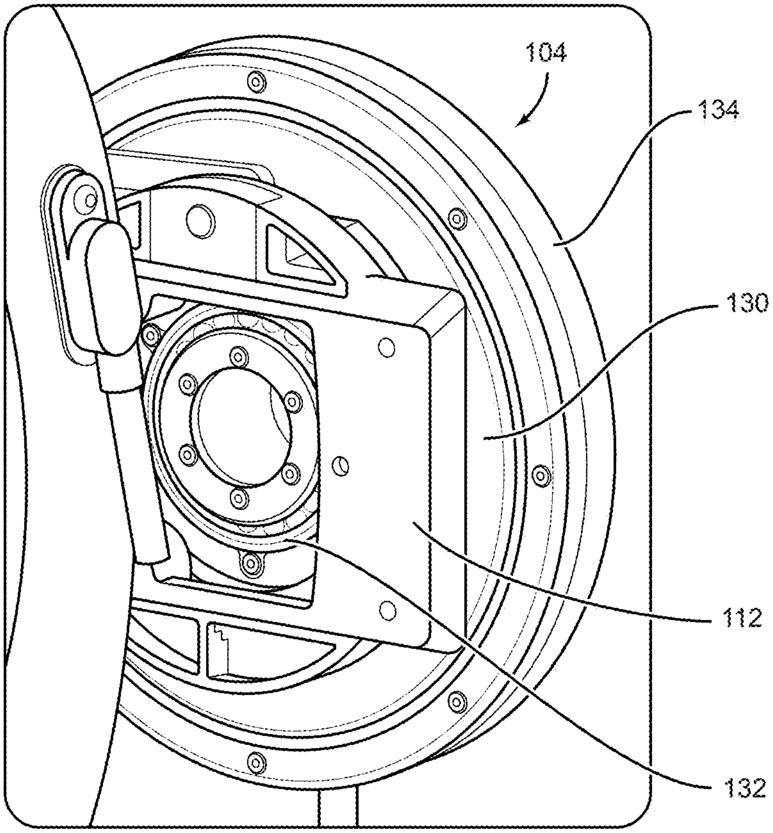
FIG. 6 is an interior view of a tilt motor.

Tilt motors 104 are also PCB stator motors and are configured more typically with bearings within their rotors. FIG. 6 shows a tilt motor 104 from an interior perspective, showing the tilt motor rotor 130 mounted around at least one interior ball bearing 132. Tilt motor rotor 130 is driven by a PCB stator that fits into a slot created by two portions of rotor 130, where each portion of rotor 130 has magnets affixed thereto that are configured to interact with induced magnetism in the PCB stator during motor operation.

Tilt motor 104 is shown with rotor 130 coupled to tilt motor mount 112. Thus, operation of tilt motor 104 causes roll motor 102 to tilt, which, in turn causes a camera mounted within the roll motor 102 to tilt. To bring about smooth tilting while minimizing torque on roll motor 102, two tilt motors 104 can be implemented. With a tilt motor 104 positioned on either side of roll motor 102, and each tilt motor coupled with roll motor by a separate tilt motor mount, both tilt motors 104 working together can more easily cause roll motor 102 to tilt without resulting in undue stress resulting from twisting roll motor 102 as a tilt is performed.

FIG. 7 shows the same tilt motor as FIG. 6 from an exterior perspective. From this view, tilt motor casing 134 is visible. Tilt motor 104 is shown with two cables connected to it. Those cables can deliver power, data, act as I/O, and so on. For example, one or more cables can be connected to a control console, a power supply, or both.

FIG. 8 shows the tilt motor from FIG. 7 with the tilt motor casing 134 removed. Behind tilt motor casing 134 is tilt motor control PCB 136. Tilt motor control PCB 136 can include electronics necessary to drive tilt motor 104. From this view, tilt motor bearing 132 is visible, too. Tilt motor magnets 138 are visible on tilt motor rotor 130, and adjacent to those components is tilt motor PCB stator 140.

Figure 9:
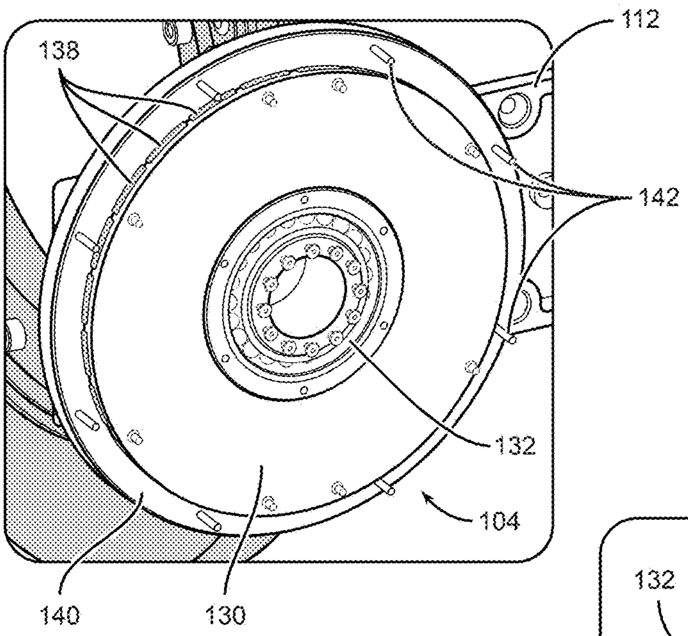
FIG. 9 is the same view with the control PCB removed.
Figure 10:
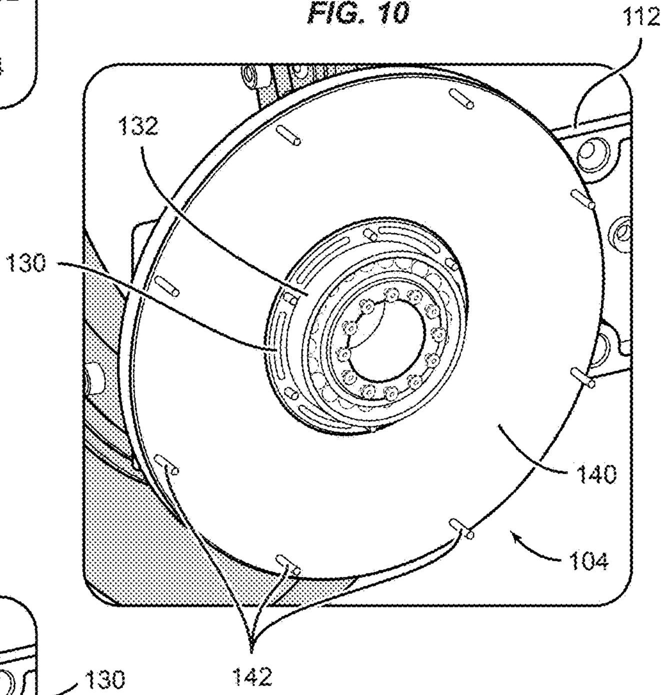
FIG. 10 is the same view showing the PCB stator.
Figure 11:
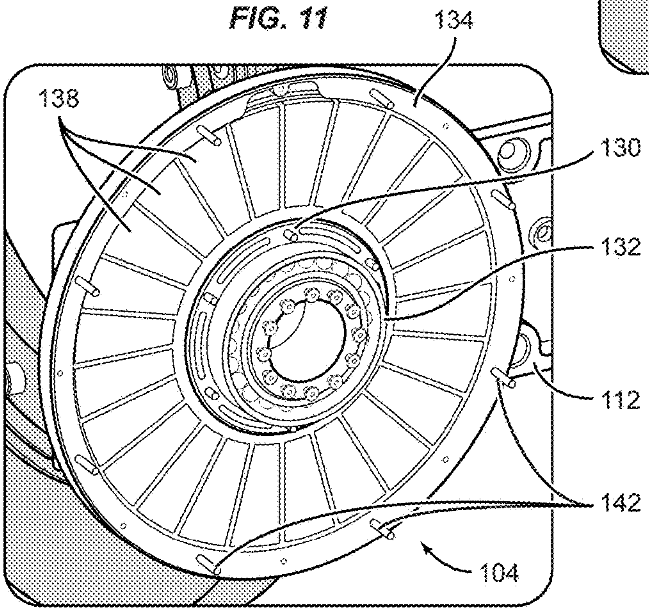
FIG. 11 is the same view showing a side of the tilt rotor having a set of magnets affixed thereto.

FIG. 8 shows the tilt motor from FIG. 8 with tilt motor control PCB 136 removed. This shows tilt motor rotor 130 and makes tilt motor ball bearing 132 more easily visible. FIG. 9 shows tilt motor 104 with the exterior portion of tilt motor rotor 130 removed, showing tilt motor PCB stator 140 more clearly. In FIG. 10, tilt motor 104 is shown with tilt motor PCB stator 140 removed, which shows the interior portion of tilt motor rotor 130 along with its associated magnets 138. Tilt motor PCB stator 140 is coupled with tilt motor casing 134 (both exterior and interior portions, where only the interior portion is shown in FIG. 10) by, e.g., screws 142. Finally, in FIG. 11, tilt motor 104 is shown with PCH stator 140 hidden, which shows off the distribution of tilt motor magnets 138. Each magnet is formed as a portion of an annulus and is disposed circumferentially about a center point. Any set of magnets coupled with a rotor described in this application can abide by this description.

Figure 12:
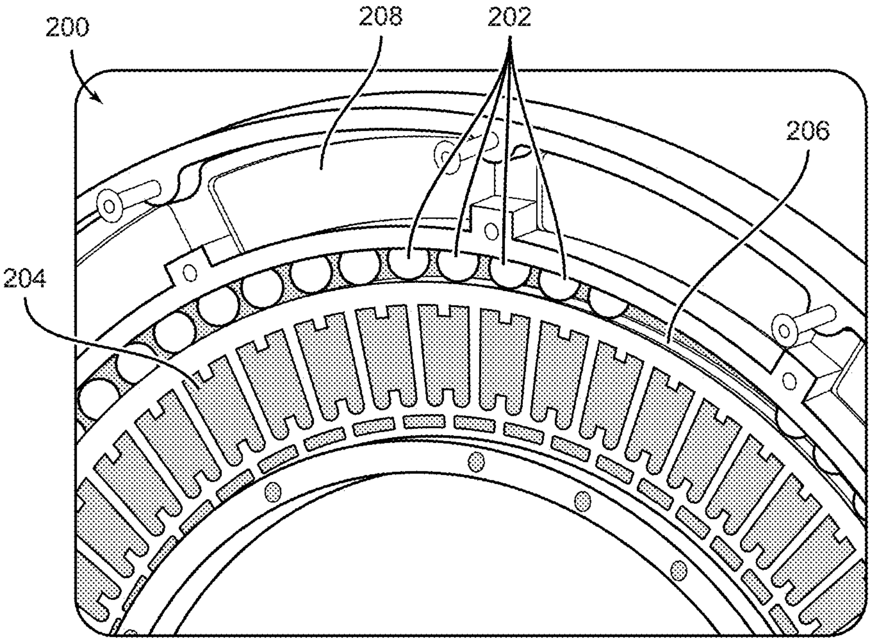
FIG. 12 shows an alternative bearing configuration.
Figure 13:
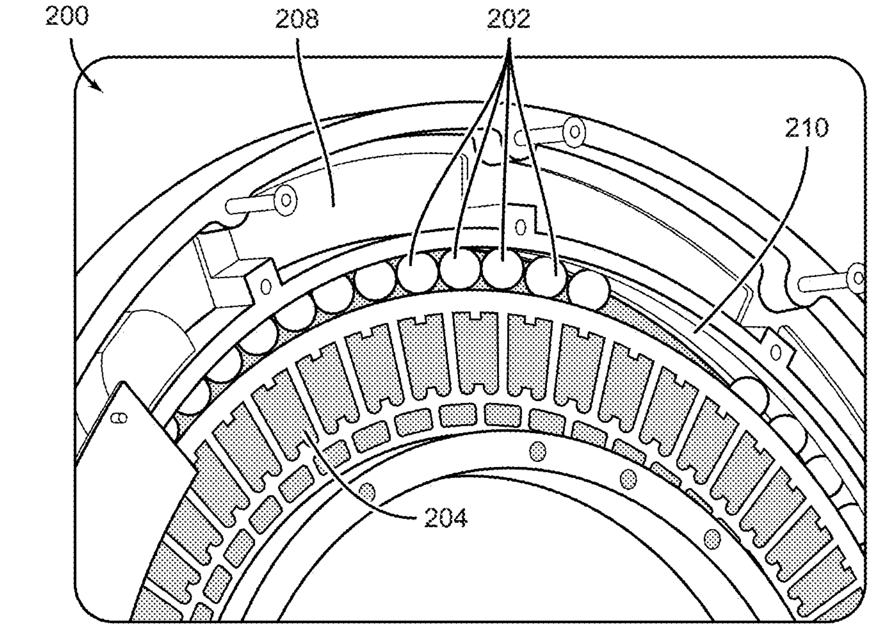
FIG. 13 shows the alternative bearing configuration from a different view.

FIGS. 12 and 13 show a camera system 200 having an alternative bearing configuration. This configuration features a ball bearing that is created by introducing ball bearing elements 202 in between an exterior edge of one side of the rotor 204, where the exterior edge features a groove 206 that is configured to entrap bearing elements 202 as shown in FIG. 12. FIG. 13 shows that an interior edge of casing piece 208 is also configured to interact with bearing elements 202 to create a ball bearing that allows rotor 204 to rotate relative to casing piece 208. Interior edge of casing piece 208, as shown in FIG. 13, also includes a groove 210 that entraps bearing elements 202 to create a ball bearing. As with other embodiments described in this application, rotor 204 is configured with two halves, such that a PCB stator can be disposed therebetween. The PCB stator does not move relative to casing piece 208, which thus allows rotor 204 to rotate relative to the PCB stator. These elements are shown in other figures in this application and apply equally to FIGS. 12 and 13, which differ only in the type of bearing element implemented to allow rotor 204 to rotate.

Thus, specific systems and methods directed to camera control and stabilization systems have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A printed circuit board (PCB) stator motor for camera control and stabilization systems, comprising:

an annular motor casing, an annular PCB stator coupled with the annular motor casing, and an annular rotor;

each annular component having an open center sized and dimensioned to accommodate a camera:

wherein the annular rotor comprises at least one camera mounting component;

wherein the annular rotor is enabled to rotate by a set of bearings located circumferentially around the annular rotor;

wherein each bearing of the set of bearings comprises a track wheel having a groove that is sized and dimensioned to receive an outer edge of the annular rotor; and wherein each bearing of the set of bearings is attached to an interior portion of the annular motor casing.

2. The PCB stator motor of claim 1, wherein the annular rotor comprises a slot into which the annular PCB stator extends.

3. The PCB stator motor of claim 1, wherein each of the track wheels is sized and dimensioned to receive an exterior edge of the annular rotor.

4. The PCB stator motor of claim 1, wherein each bearing of the set of bearings is attached to the annular motor casing.

5. A printed circuit board (PCB) stator motor for camera control and stabilization systems, comprising:

a PCB stator and a rotor, wherein the PCB stator is configured to cause the rotor to rotate, and the rotor is enabled to rotate by a set of bearings located circumferentially around the rotor;

wherein the rotor comprises at least one camera mounting component;

wherein each bearing of the set of bearings is configured to interact an outer edge of the rotor; and wherein each bearing of the set of bearings comprises a groove that is configured to interact with the outer edge of the rotor.

6. The PCB stator motor of claim 5, further comprising an annular motor casing that has an interior portion wherein at least a portion of the rotor is disposed within the interior portion.

7. The PCB stator motor of claim 6, wherein each bearing of the set of bearings is attached to the interior portion of the annular motor casing.

8. The PCB stator motor of claim 5, wherein the rotor comprises a slot facing radially outward into which the PCB stator extends.

9. The PCB stator motor of claim 5, wherein the rotor comprises a front side and a back side, the front side comprising a first set of magnets and the back side comprising a second set of magnets, and wherein the first set of magnets and the second set of magnets are positioned opposite each other across a slot formed by the front side and the back side of the rotor.

10. A printed circuit board (PCB) stator motor comprising:

an annular rotor forming a slot, wherein the slot faces radially outward;

an annular PCB stator extending into the slot, wherein the annular PCB stator is configured to cause the annular rotor to rotate, and the annular rotor is enabled to rotate by a set of bearings located circumferentially around the annular rotor;

wherein the annular rotor features an open center sized and dimensioned to accommodate a camera;

wherein the rotor comprises at least one camera mounting component; and wherein each bearing of the set of bearings comprises a wheel having a groove that is configured to interact with an outer edge of the rotor.

11. The PCB stator motor of claim 10, further comprising a motor casing comprising an interior portion wherein at least a portion of the annular rotor is disposed within the interior portion.

12. The PCB stator motor of claim 11, wherein each bearing of the set of bearings is attached to an interior portion of the motor casing.

13. The PCB stator motor of claim 10, wherein the annular rotor comprises a front side and a back side, the front side comprising a first set of magnets and the back side comprising a second set of magnets, and wherein the first set of magnets and the second set of magnets are positioned opposite each other across the slot, which is formed by the front side and the back side of the rotor.

* * * * *